(12) United States Patent
Hardee et al.

(10) Patent No.: US 9,996,769 B2
(45) Date of Patent: Jun. 12, 2018

(54) DETECTING USAGE OF COPYRIGHTED VIDEO CONTENT USING OBJECT RECOGNITION

(71) Applicant: International Business Machines Corporation, Armonk, NY (US)

(72) Inventors: Christopher J. Hardee, Raleigh, NC (US); Steven Robert Joroff, Tokyo (JP); Pamela Ann Nesbitt, Ridgefield, CT (US); Scott Edward Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 15/177,048

(22) Filed: Jun. 8, 2016

(65) Prior Publication Data
US 2017/0357875 A1 Dec. 14, 2017

(51) Int. Cl.
*G06K 9/00* (2006.01)
*G06K 9/62* (2006.01)
(Continued)

(52) U.S. Cl.
CPC ......... *G06K 9/6201* (2013.01); *G06K 9/3241* (2013.01); *G06T 7/0022* (2013.01); *G06K 9/00* (2013.01); *G06T 2207/10016* (2013.01)

(58) Field of Classification Search
CPC ......... G06F 17/30784; G06F 17/30825; G06F 17/30743; G06F 15/803; G06F 17/30017;
(Continued)

(56) References Cited

U.S. PATENT DOCUMENTS 6,182,069 B1 * 1/2001 Niblack ............. G06F 17/3025
6,185,314 B1 * 2/2001 Crabtree ............... G01S 3/7865
348/169

(Continued)

OTHER PUBLICATIONS

Bhatt, "Use Violation Alerts of Data Loss Prevention Software to determine most likely suspect during Early Case Assessment (ECA)." IP.com Prior Art Database Technical Disclosure. Aug. 26, 2010, 6 pages.
(Continued)

*Primary Examiner* — Aklilu Woldemariam
(74) *Attorney, Agent, or Firm* — Amin, Turocy & Watson, LLP

(57) ABSTRACT

Techniques detecting usage of copyrighted video content using object recognition are provided. In one example, a computer-implemented method comprises determining, by a system operatively coupled to a processor, digest information for a video, wherein the digest information comprises objects appearing in the video and respective times at which the objects appear in the video. The method further comprises comparing, by the system, the digest information with reference digest information for reference videos, wherein the reference digest information identifies reference objects appearing in the reference videos and respective reference times at which the reference objects appear in the reference videos. The method further comprises determining, by the system, whether the video comprises content included in one or more of the reference videos based on a degree of similarity between the digest information and reference digest information associated with one or more of the reference videos.

20 Claims, 13 Drawing Sheets

(51) Int. Cl.
*G06K 9/32* (2006.01)
*G06T 7/00* (2017.01)

(58) Field of Classification Search
CPC ........... G06F 17/30545; G06F 17/3074; G06F 17/3079; G06F 17/3082; G06F 17/30864; G06F 7/38; G06F 7/76; G06F 9/46; G06F 9/50; G06F 17/30811; G06F 17/30793; G06F 17/30253; G06F 17/30707; G06F 17/30746; G06F 17/30787; G06F 17/30796; G06F 17/30802; G06F 21/10; G06F 2221/074; G06F 17/30038; G06K 9/00744; G06K 9/3241; G06K 9/00711; G06K 9/00771; G06K 9/00295; G06K 9/32; G06K 9/00369; G06K 9/4642; G06K 9/00624; G06T 2207/10016; G06T 2207/30241; G06T 15/00; G06T 2207/30196; G06T 2207/30201; G06T 2207/30232; G06T 7/251; G06T 7/29; G06T 7/246; G06T 2207/20052; G06T 7/215; G06T 7/238; G06T 7/277; G06T 7/536; G06T 7/11; G06T 7/162; H04N 21/23418; H04N 21/2408; H04N 21/2743; G01S 3/7865; H04L 63/30; H04L 65/60
USPC ................ 382/103, 115, 116, 124, 126, 195; 713/176, 182, 186, 200, 225; 705/57, 58, 705/59

See application file for complete search history.

(56) References Cited

U.S. PATENT DOCUMENTS

| | | | | |
|---|---|---|---|---|
| 6,263,088 | B1* | 7/2001 | Crabtree | G01S 3/7865 348/169 |
| 6,295,367 | B1* | 9/2001 | Crabtree | G01S 3/7865 382/103 |
| 7,363,277 | B1 | 4/2008 | Dutta et al. | |
| 8,094,872 | B1* | 1/2012 | Yagnik | H04N 21/23418 380/201 |
| 8,184,953 | B1* | 5/2012 | Covell | G11B 27/28 380/201 |
| 8,587,668 | B2 | 11/2013 | Haritaoglu | |
| 8,731,307 | B2* | 5/2014 | Kashiwagi | G06K 9/00711 382/157 |
| 8,732,858 | B2 | 5/2014 | Wold | |
| 8,913,851 | B1* | 12/2014 | Marwood | G06K 9/4671 382/190 |
| 8,966,571 | B2 | 2/2015 | Granstrom | |
| 9,177,209 | B2* | 11/2015 | Chang | G06F 17/30781 |
| 9,207,964 | B1* | 12/2015 | Gwosdek | G06F 17/30743 |
| 9,652,534 | B1* | 5/2017 | Narayanan | G06F 17/30825 |
| 2003/0033347 | A1* | 2/2003 | Bolle | G06F 17/30253 718/107 |
| 2003/0061490 | A1 | 3/2003 | Abajian | |
| 2005/0286774 | A1* | 12/2005 | Porikli | G06K 9/00335 382/225 |
| 2009/0003799 | A1* | 1/2009 | Inoha | G06F 17/30265 386/323 |
| 2010/0085481 | A1* | 4/2010 | Winter | G06K 9/00711 348/513 |
| 2010/0166261 | A1* | 7/2010 | Tsuji | G06K 9/00228 382/103 |
| 2010/0280984 | A1* | 11/2010 | Gengembre | G06F 17/30247 706/52 |
| 2010/0306193 | A1* | 12/2010 | Pereira | G06F 17/30784 707/728 |
| 2011/0222782 | A1* | 9/2011 | Kashiwagi | G06K 9/00711 382/218 |
| 2012/0042134 | A1* | 2/2012 | Risan | G06F 21/10 711/154 |
| 2013/0051666 | A1* | 2/2013 | Atkins | H04N 19/597 382/167 |
| 2013/0148898 | A1* | 6/2013 | Mitura | G06K 9/62 382/195 |
| 2013/0188880 | A1* | 7/2013 | Baba | G06K 9/6267 382/224 |
| 2014/0176708 | A1* | 6/2014 | Ramakrishnan | G06K 9/624 348/143 |

OTHER PUBLICATIONS

Aaron, "Method for Preventing Data Loss by Using Data Loss Prevention Solution and Multifactor Authentication Technique." IP.com Prior Art Database Technical Disclosure. Aug. 29, 2011, 5 pages.

Grill, "Detecting Malicious Network Behavior Using Only TCP Flag Information." IP.com Prior Art Database Technical Disclosure. Aug. 6, 2014, 22 pages.

Audible Magic, "Media Identification," http://www.audiblemagic.com/media-identification/ Last Accessed: May 27, 2016, 5 pages.

* cited by examiner

Video 200 Digest Information

| Object Order | Start Time | End Time | Length | $L_1$ | $L_2$ | $L_3$ | $L_4$ | $L_5$ |
|---|---|---|---|---|---|---|---|---|
| 1 | A | T0 | T3 | 3 | 1 | N/A | N/A | N/A | N/A |
| 2 | B | T1 | T3 | 2 | N/A | 0 | | N/A | N/A |
| 3 | C | T1 | T5 | 4 | N/A | N/A | 3 | N/A | N/A |
| 4 | D | T4 | T8 | 3 | N/A | N/A | N/A | 2 | N/A |
| 5 | E | T7 | T9 | 2 | N/A | N/A | N/A | N/A | 1 |
| 6 | F | T8 | T9 | 2 | N/A | N/A | N/A | N/A | N/A |

FIG. 4

Video 200 Digest Information

| Frame | Objects | Coordinates | Size Ratio |
|---|---|---|---|
| $202_1$ | A | (1,10) | N/A |
| $202_2$ | A,B | (1,10), (5,5) | 3/2 |
| $202_3$ | A,B,C | (1,10), (5,5), (8,3) | 3/2/5 |
| $202_4$ | C | (8,3) | N/A |
| $202_5$ | C,D | (8,3), (6,7) | 5/1 |
| $202_6$ | D | (6,7) | N/A |
| $202_7$ | D,E | (6,7), (4,4) | 1/6 |
| $202_8$ | E,F | (4,4), (6,1) | 6/0.5 |
| $202_9$ | F | (5,6) | N/A |

FIG. 7

DETECTING USAGE OF COPYRIGHTED VIDEO CONTENT USING OBJECT RECOGNITION

FIELD OF USE

The subject disclosure relates to detecting usage of copyrighted video content using object recognition.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate detecting usage of copyrighted media content are described.

According to an embodiment, a computer-implemented method can comprise determining, by a system operatively coupled to a processor, digest information for a video, wherein the digest information comprises objects appearing in the video and respective times at which the objects appear in the video. The computer-implemented method can also comprise comparing, by the system, the digest information with reference digest information for reference videos, wherein the reference digest information identifies reference objects appearing in the reference videos and respective reference times at which the reference objects appear in the reference videos. The computer-implemented method can also comprise determining, by the system, whether the video comprises content included in one or more of the reference videos based on a degree of similarity between the digest information and reference digest information associated with one or more of the reference videos.

According to another embodiment, another computer-implemented method is provided. The computer-implemented method can comprise determining, by a system operatively coupled to a processor, digest information for a video, wherein the digest information comprises objects appearing in the video and an order in which the objects appear in the video. The computer-implemented method can also comprise comparing, by the system, the digest information with reference digest information for reference videos, wherein the reference digest information identifies reference objects appearing in the reference videos and reference orders in which the reference objects respectively appear in the reference videos. The computer-implemented method also comprises determining, by the system, whether the video comprises content included in one or more of the reference videos based on a degree of similarity between the digest information and reference digest information associated with one or more of the reference videos.

According to yet another embodiment, a computer program product for digital video copyright protection is provided. The computer program product can comprise a computer readable storage medium having program instructions embodied therewith. The program instructions can be executable by a processing component and cause the processing component to determine, by the processing component, digest information for a video, wherein the digest information comprises objects appearing in the video, respective times at which the objects appear in the video, and time lengths between the respective times at which the objects appear in the video. The program instructions can be further executable by a processing component to cause the processing component to compare the digest information with reference digest information for reference videos, wherein the reference digest information identifies reference objects appearing in the reference videos, respective reference times at which the reference objects appear in the reference videos, and reference time lengths between the respective times at which the reference objects appear in the reference videos. Further, the program instructions can be executable by the processing component and cause the processing component to determine whether the video comprises content included in one or more of the reference videos based on a degree of similarity between the digest information and reference digest information associated with one or more of the reference videos.

DESCRIPTION OF THE DRAWINGS

FIG. 4 illustrates a chart including example digest information for a video in accordance with one or more embodiments described herein.

FIG. 7 illustrates another chart including example digest information for a video in accordance with one or more embodiments described herein.

DETAILED DESCRIPTION

Figure 1:
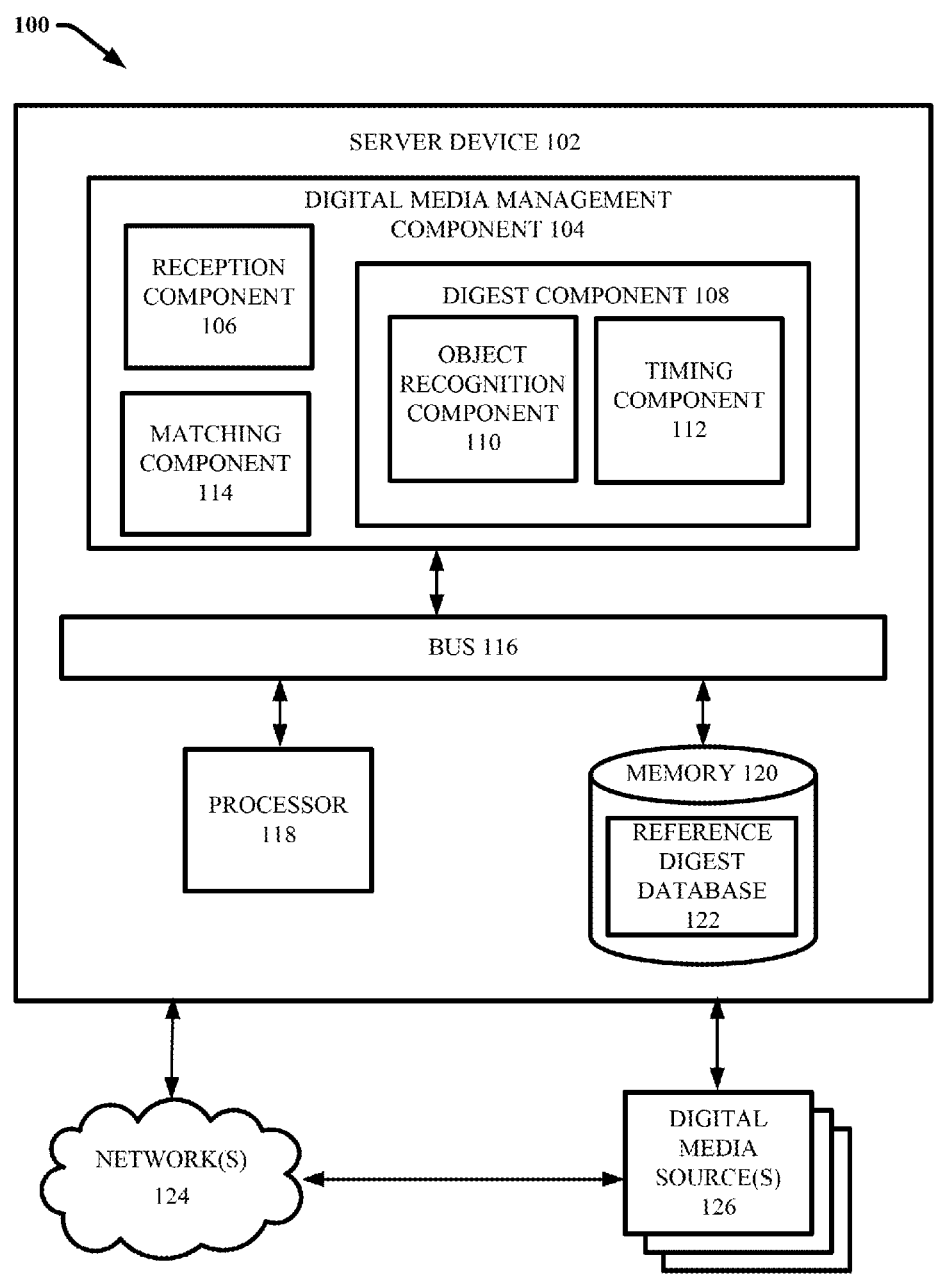
FIG. 1 illustrates a block diagram of an example, non-limiting system that facilitates detecting usage of copyrighted video content using object recognition in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With the rise of media publishing and distribution via the Internet, users around the world can access a voluminous quantity of media content (e.g., video and audio content). Further, the popularity of social networking has made sharing media content a highly profitable mechanism to increase viewership and generate revenue. As a result, new and old media content is regularly downloaded, copied and shared with the touch of a button. Given the ease with which media content can be viewed, and in many scenarios copied or downloaded, the task of detecting the unauthorized usage of copyrighted media content via the Internet has become extremely difficult for humans and even basic computer processing systems to perform effectively and efficiently. As used herein, a "copyrighted media item" refers to a media item that cannot be copied, reproduced, published, sold or distributed without authorization from an entity or group of entities associated with ownership of the one or more copyrights for the media item.

The subject disclosure is directed to computer processing systems, computer-implemented methods, apparatus and/or computer program products that facilitate efficiently, effectively, and automatically (e.g., without direct human involvement) detecting usage of copyrighted media content, and more particularly copyrighted video content. For example, usage of copyrighted video content can include the creation of a new video by partially modifying an aspect of a copyrighted video (e.g., changing the coloration, saturation, luminosity, speed). In another example, usage of copyrighted video content can include the creation of a new video using parts of one or more copyrighted videos. In another example, usage of copyrighted video content can include copying, publishing or selling the copyrighted video content without authorization from the copyright holder.

In order to facilitate detecting unauthorized usage of copyrighted video content, one or more embodiments described herein include object matching techniques that involve identifying whether a video includes copyrighted video content based on correspondence between visual objects appearing in the video and the copyrighted video content. In one or more embodiments, a reference digest database is initially generated using automated object recognition for one or more known videos. The one or more known videos are referred to as "reference videos." In various implementations, the known or reference videos include video content that has been copyrighted or otherwise restricted for usage (e.g., copying, reproducing, publishing, selling, or distributing) by a single entity or a group of entities. The reference digest database includes information identifying the respective reference videos and digest information for the respective reference videos related to the objects appearing in the reference videos. For example, reference digest information for each reference video (or, in some embodiments, one or more reference videos) can include, but is not limited to, information identifying objects present in the reference video, detailed characteristics of the objects appearing in the reference video (e.g., object coloration, object type), an order of appearance of the objects, timing of appearance of the objects, and/or spatial relationships of two or more of the objects included in a same video frame or segment.

Newly identified or received videos can be screened against the reference digest database to determine whether they are or include reference video content. For example, in one or more implementations, digest information can be generated for a new video in the same or similar manner employed to generate the reference digest information for the reference videos. The digest information for the new video is further compared against the reference digest information for the reference videos to identify a match between the content of the new video and the content of the reference videos based on a degree of similarity between the digest information for the new video and the digest information for the respective reference videos. If the digest information for the new video does not satisfy a defined criterion (e.g., meet a threshold value) relative to reference digest information for one or more of the reference videos, the new video and the digest information for the new video can be added to the reference digest database as a new entry. However, if the digest information for the new video satisfies the defined criterion (has a threshold level of similarity or sameness) one or more policies can be automatically enforced that facilitate mitigating the unauthorized usage of the reference video content (e.g., notifying the copyright holder, rejecting or removing publication of the new video, providing a royalty payment to the copyright holder).

The computer processing systems, computer-implemented methods, apparatus and/or computer program products employ hardware and/or software to solve problems that are highly technical in nature (e.g., related to automated detection of correspondence between digital video content and copyrighted digital video content), that are not abstract and that cannot be performed as a set of mental acts by a human. For example, a human, or even thousands of humans, cannot efficiently, accurately and effectively manually analyze the voluminous amounts of new electronic video content shared via the Internet daily to identify whether the video content includes copyrighted video content. One or more embodiments of the subject computer processing systems, methods, apparatuses and/or computer program products can enable the automated detection of copyrighted video content in a highly accurate and efficient manner. By employing object recognition and object matching to detect correspondence between video content, the processing time and/or accuracy associated with the existing digital media copyright detection systems is substantially improved. Further, one or more embodiments of the subject techniques facilitate automatically and/or accurately identifying videos that have been modified in an attempt to avoid automated copyright infringement detection. For example, by determining correspondence between timing of appearance of objects in a video and a copyrighted video, one or more embodiments of the object based matching techniques described herein facilitate identifying videos that include copyrighted video content that has been modified. For instance, one or more embodiments of the subject techniques enable detecting videos including copyrighted video content in which the speed of the video content has been increased or decreased, one or more new objects have been overlaid onto the copyrighted video content, coloration has been applied and/or the like.

Further, one or more embodiments of the computer processing systems, computer-implemented methods, apparatuses and/or computer program products facilitate automatically mitigating the unauthorized usage of copyrighted video content. For example, in response to identifying a video that is or includes copyrighted video content, one or more embodiments of the computer processing systems, computer-implemented methods, apparatuses and/or computer program products can automatically reject or remove publication of the video, notify the copyright holder, facilitate provision of a royalty payment to the copyright holder or perform any number of other mitigation functions.

FIG. 1 illustrates a block diagram of an example, non-limiting system 100 that facilitates detecting usage of copyrighted video content using object recognition in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As shown in FIG. 1, the system 100 can include a server device 102, one or more networks 124 and one or more digital media sources 126. The server device 102 can include digital media management component 104, which can include reception component 106, digest component 108, and matching component 114. The server device 102 can also include or otherwise be associated with at least one include memory 120 that stores computer executable components (e.g., computer executable components can include, but are not limited to, the digital media management component 104 and associated components). The server device 102 can also include or otherwise be associated with at least one processor 118 that executes the computer executable components stored in the memory 120. The server device 102 can further include a system bus 116 that can couple the various components including, but not limited to, the digital media management component 104 and associated components, memory 120 and/or processor 118. While a server device 102 is shown in FIG. 1, in other embodiments, any number of different types of devices can be associated with or include the components shown in FIG. 1 as part of the digital media management component 104. All such embodiments are envisaged.

The digital media management component 104 facilitates detecting usage of copyrighted media content, and more particularly, detecting usage of copyrighted video content. The term "media content" can include, but is not limited to, streamable and dynamic media (e.g., video, live video, video advertisements, music, music videos, sound files, animations). The term "video" includes, but is not limited to, a sequence of images that form a moving picture. The term "video content" can include, but is not limited to, two or more consecutive moving images or frames of a video, video segments, animations, single images or frames of a video, and portions of one or more images or frames of a video.

The reception component 106 can receive video content for processing by digital media management component 104 to detect reference video content embedded in or associated with another video. For example, reception component 106 can receive reference videos for processing by digital media management component 104 in association with generating a reference digest database 122. The reception component 106 can also receive new videos for processing by digital media management component 104 to determine whether the new videos include reference video content.

In various embodiments, the reception component 106 can receive video content from one or more digital media sources 126. The one or more digital media sources 126 can include an internal media source that is accessible to the server device 102 either directly or via one or more networks 124 (e.g., an intranet) or an external media source that is accessible to the server device 102 via one or more networks (e.g., the Internet). For example, the one or more digital media sources 126 can include a computer-readable storage device (e.g., a primary storage device, a secondary storage device, a tertiary storage device or an off-line storage device) that stores video content. In another example, the one or more digital media sources 126 can include an information store that provides access to digital media data included in the information store via one or more networks 124. In another example, the one or more digital media sources 126 can include a digital media content provider that includes a website or application that provides videos and other types of content items or services to client devices via a network (e.g., the Internet). According to this example, the video content provided by the website or application can be downloaded, streamed or merely viewed at a client device.

In some implementations, the reception component 106 can receive a video that is uploaded to the server device 102 by a client device. For example, the media provider can include a media presentation source that has access to a voluminous quantity (and potentially an inexhaustible number) of shared video files that are uploaded to the media provider by users of the media provider. The media presentation source can further stream these media files to client devices of respective users of the media provider via the one or more networks 124.

In some implementations, the reception component 106 can scan the digital media sources 126 for video content, including reference video content and/or new video content. For example, the reception component 106 can scan various websites, applications, and network accessible storage devices for video content that can provide and/or employ reference video content in an unauthorized manner (e.g., unauthorized usage of copyrighted video content). In various embodiments, the reception component 106 can be or include hardware (e.g., a central processing unit (CPU), a transceiver, a decoder), software (e.g., a set of threads, a set of processes, software in execution) or a combination of hardware and software that facilitates receiving video content from one or more digital media sources 126.

The various components (e.g., server device 102, digital media management component 104 and associated components, digital media sources 126) of system 100 can be connected either directly or via one or more networks 124. Such networks 124 can include wired and wireless networks, including, but not limited to, a cellular network, a wide area network (WAN) (e.g., the Internet) or a local area network (LAN). For example, the server device 102 can communicate with one or more digital media sources 126

(and vice versa) using virtually any desired wired or wireless technology, including, for example, cellular, WAN, wireless fidelity (Wi-Fi), Wi-Max, WLAN, and etc. Further, although in the embodiment shown the digital media management component 104 is provided on a server device 102, it should be appreciated that the architecture of system 100 is not so limited. For example, the digital media management component 104 or one or more components of digital media management component 104 can be located at another device, such as another server device, a client device, etc.

Digest component 108 can generate digest information for one or more videos. The term "digest information" is used herein to refer to one or more visual features associated with a video. Digest information can distinguish the video from one or more other videos and/or identify the video, providing functionality similar to that of a fingerprint. For example, in the field of audio matching, an acoustic fingerprint is a condensed digital summary of audible features deterministically generated from an audio signal that can be used to identify an audio sample or locate similar items in an audio database. A digest or digest information for a video can be likened to an audio fingerprint for an audio signal wherein the audible features are replaced with visual features included in the video. In one or more implementations, these visual features can include, but are not limited to, objects appearing in the video (e.g., persons, places, things). In addition to the objects appearing in the video, digest information for a video can also include, but is not limited to, detailed characteristics associated with the objects (e.g., coloration, type), order of appearance of the objects, timing of appearance of the objects and/or spatial relationships between two or more objects appearing in a same frame or segment of the video. In some embodiments, a segment of a video can include any amount of the video less than the whole video. For example, a segment of a video can include one or more frames of the video (e.g., one frame, two frames, five frames, ten frames) or any selected time segment including one or more seconds or milliseconds of the video (e.g., one second, two seconds, five seconds, ten seconds).

In one or more embodiments, digest component 108 can generate a compilation of reference digest information for a set of known reference videos that have been previously provided or made accessible to the digital media management component 104 (e.g., via reception component 106). For example, the digital media management component 104 can be provided with a voluminous quantity (and potentially an inexhaustible number) of reference videos and generate digest information for one or more of (or, in some embodiments, each of) the reference videos. In various implementations, the reference videos can include video content that has been copyrighted or otherwise restricted for usage (e.g., copying, reproducing, publishing, selling, or distributing) by a single entity or group of entities. In some implementations, the digest component 108 can organize the reference digest information for the reference videos in a reference digest database 122. For example, the reference digest database 122 can include information identifying one or more of (or, in some embodiments, each of) the reference videos and the digest information respectively associated with the one or more of (or, in some embodiments, each of) the reference videos. The reference digest database 122 can be stored at a location that is accessible to the digital media management component 104. For example, in the embodiment shown, the reference digest database is provided in the memory 120 of the server device 102. However, it should be appreciated that the reference digest database 122 can be located at another suitable device that is accessible to the digital media management component 104 via a direct connection or via one or more networks 124.

A digest or digest information for a video can represent the video as a whole and/or can represent slices or segments of the video. For example, a video creator can create a new video by combining pieces or parts of two or more reference videos. For instance, the new video can include a compilation of video segments from different reference videos. Thus, in order to facilitate identifying new videos that include content of a reference video, the digest component 108 can generate digest information for one or more of the references video that uniquely identifies the reference videos as a whole and/or uniquely identifies one or more different slices or segments of the reference videos. For example, the digest component 108 can divide a reference video into two or more slices or segments, each respectively including parts of the video (e.g., one or more portions of the video having a duration less than the whole video). Accordingly, as used herein, the term "video" can also include slices or segments of a whole video.

In some implementations, the digest component 108 can generate digest information for slices or segments of the reference videos. In other implementations, the digest component 108 can determine whether and/or how to generate digest information for different slices or segments of a reference video based on one or more defined factors. For example, in one embodiment, the digest component 108 can generate reference digest information for two or more slices or segments of a reference video based on duration of the reference video, wherein longer videos are digested into a greater number of segments than the number of segments for shorter videos. For example, the digest component 108 can employ defined criteria based on the length of the reference video. In some embodiments, reference videos having a duration less than N can be digested as a whole; reference videos having a duration greater than N and less than M can be digested as two separate segments; reference videos having a duration greater than M and less than P are digested as three separate segments, and so on, wherein N, M, and P are numbers representative of numbers of video frames and/or numbers of seconds or minutes of a reference video. In another embodiment, the digest component 108 can generate reference digest information for different segments or slices of the reference videos based on a level of importance of the respective reference videos, wherein those reference videos that are considered more highly ranked than others are digested into a greater number of segments or slices. According to this example, the level of rank of a reference video can reflect a cost associated with the reference video, such as cost associated with protection against usage of the copyrighted content of the reference video. For example, a reference video that is associated with a high royalty payment in association with usage of content of the reference video may be classified as having a high importance level and thus digested into several segments or slices to facilitate increasing the probability of finding new videos that include content from only a portion of the reference video. In another embodiment, the digest component 108 can generate digest information for different segments or slices of reference videos based on a quality and/or technical complexity of the video (e.g., resolution, compression).

The manner in which the digest component 108 slices a reference video in association with generating digest information for the different slices or segments of the reference video can vary. In some implementations, the digest component 108 can slice a video into segments of equal duration.

For example, a reference video that is two minutes long can be sliced at the one minute marker into two segments having substantially equal length durations. In another implementation, the digest component 108 can slice a reference video based on detection or identification of scene transitions (e.g., using tag metadata that was previously associated with the reference video or another suitable approach), wherein the video is sliced at the respective scene transitions. In another example implementation, the digest component 108 can slice a reference video based on detection of noteworthy or popular objects, scenes or events in the reference video (e.g., using tag metadata that was previously associated with the reference video or another suitable approach). According to this example, if a reference video includes a segment with an actor reciting a popular quote, the digest component 108 can generate first reference digest information for the segment in addition to generating second reference digest information for the whole reference video.

After the reference digest database 122 has been generated (e.g., by digest component 108 or another system or entity), the digital media management component 104 can employ the digest component 108 to generate digest information for new videos received by or otherwise provided to the digital media management component 104 (e.g., via reception component 106) for analysis regarding potential usage of reference video content in the new video (e.g., copyright infringement analysis). For example, based on reception of a new video, the digest component 108 can generate digest information for the new video that includes the same or a similar type of reference digest information as the reference videos. For instance, the digest component 108 can generate digest information for the new video that includes but is not limited to, objects appearing in the video, detailed characteristics of the objects (e.g., object coloration, object type, etc.), order of appearance of the objects, timing of appearance of the objects and/or spatial relationships between two or more objects appearing in a same frame or segment of the video. The matching component 114 can further compare the digest information for the new video with the reference digest information for the reference videos in the reference digest database 122 to determine whether the new video includes content of one or more of the reference videos based on a degree of similarity between the digest information for the new video and the reference digest information for the respective reference videos.

In one or more embodiments, the digest component 108 can include object recognition component 110 and timing component 112 to facilitate generating digest information for videos (e.g., reference videos, slices or segments of the reference videos, newly received videos not previously included in the reference digest database 122, slices or segments of the newly received videos). The object recognition component 110 can identify objects (e.g., persons, places, things) that appear in a video using hardware, software, or a combination of hardware and software that provides for automated detection of visual objects, appearing in video or digital image. Object recognition algorithms can rely on matching, learning, or pattern recognition algorithms using appearance-based or feature-based techniques. Techniques include, but are not limited to, edges, gradients, histogram of oriented gradients (HOG), Haar wavelets and/or linear binary patterns.

In various embodiments, the object recognition component 110 can identify objects appearing in a video using a variety of models, including, but not limited to, extracted features and boosted learning algorithms, bag-of-words models with features such as speeded-up robust features (SURF) and maximally stable external regions (MSER), gradient-based and derivative-based matching approaches, Viola-Jones algorithm, template matching, image segmentation and/or blob analysis.

In some implementations, the object recognition component 110 can determine detailed characteristics associated with identified objects to increase the accuracy of identifying matching objects included in a new video and a reference video. The detailed characteristics can include any potential characteristic about an object that can be discerned by the object recognition component 110. For example, the detailed characteristics can relate to a coloration of the object, a type of the object or an identity associated with the object. For instance, in addition to detecting a car appearing in a video, the object recognition component 110 can identify a coloration of the car, a make of the car, a model of the car, a year of the car, a license plate number of the car, etc. In another example, in addition to detecting a person appearing in a video, the object recognition component 110 can determine information such as the identity (e.g., name) of the person, the approximate height and weight of the person, the clothing worn by the person, etc.

In some implementations, the object recognition component 110 can identify one or more detectable objects appearing in a video. In other implementations, the object recognition component 110 can employ discriminatory techniques to reduce the amount (and/or associated processing time) of objects identified in a video yet still identify enough objects to generate a digest for the video that sufficiently distinguishes the video to facilitate copyright infringement detection. For example, in one embodiment, the object recognition component 110 can detect objects appearing in only a portion of frames or time segments of the video (e.g., wherein a time segment of a video can include one or more frames or seconds of the video less than the whole video). According to this example, the object recognition component 110 can identify objects appearing in N frames every M frames of the video (e.g., as single frame every ten frames of the video or frames). In another example, the object recognition component 110 can select random frames or time segments of the video to identify and/or characterize objects appearing in the video. In another example, the object recognition component 110 can select a restricted number (e.g., the top three) of the most prominent objects identified in each frame or time segment of the video. Still in another example, the object recognition component 110 can employ defined criteria regarding types of objects to target for identification that are considered better candidates for establishing a unique digest for the video (e.g., particular people with known identities, known landmarks of physical structures).

Timing component 112 can determine timing information related to timing of appearance of objects identified in a video. For example, the timing component 112 can determine when an object appears in the video (e.g., referred to herein as the "start time") and/or when the object no longer appears in the video (e.g., referred to herein as the "stop time") relative to the beginning and/or the end of the video (or video segment). Based on a determination of when respective objects appear in a video, the timing component 112 can determine an order of appearance of objects identified in the video. In addition, based on a determination of when an object appears and no longer appears, the timing component 112 can also determine the duration or length of appearance of the object. The timing component 112 can also determine, in some embodiments, the duration between appearances of different object in the video. For example, the timing component 112 can determine that a white dog appears in a video ten seconds after a blue car appears in the video. The timing information can be characterized in terms of time unit (e.g., milliseconds, seconds, minutes, etc.) and/or in terms of frames.

In some embodiments, in association with reception of a video, the digital media management component 104 can receive metadata associated with a video that includes one or more tags identifying previously identified objects appearing in the video and potentially timing of appearance of the objects. For example, a user uploaded video may be previously tagged with information identifying one or more actors appearing in the video, timing information regarding the appearance of the one or more actors, physical structures appearing in the video and associated timing information, geographical locations depicted in the video and associated timing information, etc. According to these implementations, the object recognition component 110 and the timing component 112 can respectively employ the metadata previously associated with the video to identify and characterize the objects appearing in the video and the timing of appearance of the respective objects.

Figure 2:
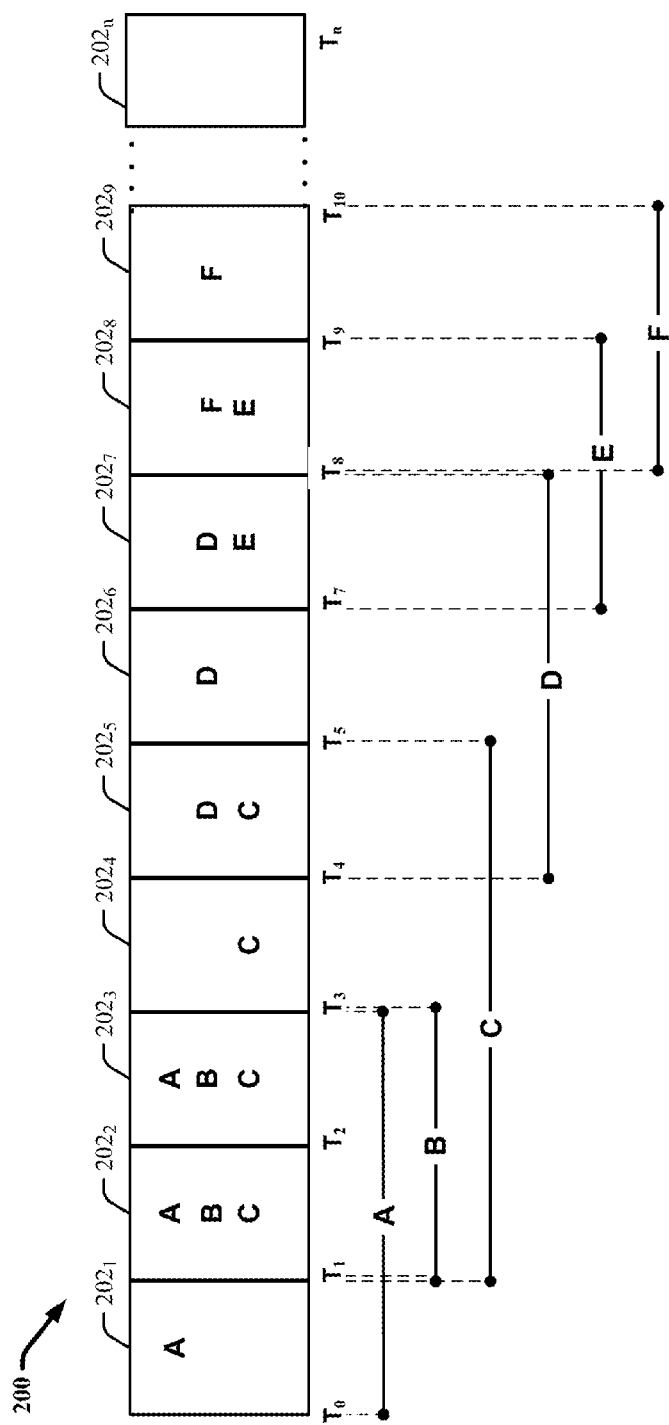
FIG. 2 illustrates an example video in which objects present in respective frames of the video have been identified in accordance with one or more embodiments described herein.

FIG. 2 illustrates an example video 200 in which objects present in respective frames of the video have been identified (e.g., via object recognition component 110 and/or timing component 112 of FIG. 1) in accordance with one or more embodiments described herein. Repetitive description of like elements employed in other embodiments described herein is omitted for sake of brevity.

The video 200 can include a plurality of frames $202_1$-$202_n$ and has a duration of time $T_0$-$T_n$. It should be appreciated that the number of frames included in a video can vary depending on the duration of the video and/or the frame rate of the video. For example, there are three main frame rate standards in television and digital cinema: 24 frames per second (FPS), 25 (FPS), and 30 (FPS). However, there are many variations on these as well as newer emerging standards (e.g., which can vary from 24 FPS to over 100 FPS). For ease of explanation, video 200 is described having a frame rate of 1 FPS. For example, the duration of time of $T_0$-$T_1$ is 1 second, the duration of $T_1$-$T_2$ is 1 second, and so on.

In the embodiment shown, objects A, B, C, D, E, and F have respectively been identified in frames $202_1$-$202_9$ (e.g., via object recognition component 110 and/or timing component 112). The different letters A, B, C, D, E and F respectively describe different objects. Consecutive letters are used to indicate the order in which the different objects appear. For example, object A appears in frames $202_1$-$202_3$, object B appears in frames $202_2$-$202_3$, object C appears in frames $202_2$-$202_5$, object D appears in frames $202_5$-$202_7$, object E appears in frames $202_7$-$202_8$, and object F appears in frame $202_8$-$202_9$. Lines -A-, -B-, -C-, -D-, -E-, and -F-, respectively represent the timing and duration of appearance of objects A, B, C, D, E and F relative to one another in video 200 over time $T_0$-$T_9$. It should be appreciated that the number of different objects included in respective frames of a video (e.g., video 200) can vary. In addition, over the course of a video (e.g., video 200), some objects can re-appear. For example, another order of objects appearing in a video (e.g., video 200) can include A, B, C, A, D, A, E, B, B, E, E, A, etc.

Referring back to FIG. 1, matching component 114 can facilitate determining whether a new video received by the digital media management component 104 (e.g., not previously determined to be a reference video or associated with the reference digest database 122) is or includes video content included in one or more of the reference videos (including portions or segments/slices of the reference videos). In particular, the matching component 114 can determine whether a new video includes content included in one or more of the reference videos associated with the reference digest database 122 based on a degree of similarity between the digest information for the new video (e.g., as determined by digest component 108), and respective reference digest information for the reference videos. For example, the matching component 114 can determine that a new video includes content included in one or more of the reference videos based on the degree of similarity between the digest information for the new video and the digest information for the one or more reference videos satisfying a defined matching criterion (e.g., in various embodiments, the similarity level being above or substantially equal to a threshold value or percentage).

The matching component 114 can employ various techniques to determine a degree of similarity between digest information for a new video and digest information for a reference video. These techniques can vary based on the type of digest information associated with the respective videos, which can include one or more of objects appearing in the video, characteristics of the objects, order of appearance of the objects, timing of appearance of the objects and/or spatial relationships between two or more objects appearing in a same frame or segment of the video.

The matching component 114 can facilitate automated digital copyright detection substantially improving the processing efficiency among processing components in existing digital copyright detection systems, reducing delay in processing performed by the processing components and/or improving the accuracy in which the processing systems identify usage of copyrighted video content. For example, the matching component 114 can automatically identify videos that include copyrighted video content in a manner that cannot be performed by a human (e.g., using approaches that are greater than the capability of a single human mind). For example, the amount of data processed, the speed of processing of the data and/or the electronic data types processed by the matching component 114 over a certain period of time can be respectively greater, faster and different than the amount, speed and data type that can be processed by a single human mind over the same period of time. For example, video data processed by the matching component 114 can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices specially designed to obtain and process raw data and/or compressed data.

In some embodiments, the matching component 114 can determine a match between a new video and a reference video based on a degree in similarity between the objects appearing in the respective videos being above a threshold value. For example, a new video that includes a minimum defined percent of the same objects appearing in a reference video can be considered a match with the reference video. For instance, in an example embodiment in which video 200 of FIG. 2 is a reference video, the matching component 114 can determine that a new video that also includes objects, A, B, C, D, E and F is a match with the reference video. The threshold amount can vary (e.g., the minimum defined percent can be 75%, 85%, 90%, 95%).

The degree of similarity can also account for similarities and/or differences between detailed characteristics of the objects. For example, the matching component 114 can consider a car appearing in the new video as not being a match with a car appearing in the reference video because the cars are different models (or have differences in other visual features). The degree of scrutiny applied by the matching component 114 with respect to correspondence between objects can vary. In some embodiments, with respect to coloration of objects, for example, the matching component 114 can account for consistency in coloration differences between respective objects appearing in a new video and a reference video to determine whether the difference in coloration of the respective objects is attributed to an adaptation of coloration settings or an effect applied to the new video (e.g., the new video may be a black and white version of the reference video or the new video may have a blue undertone applied, a different saturation level, a different luminosity level). According to these embodiments, consistent coloration differences between the respective objects of the new video and the reference video would not affect the degree of similarity between the objects.

In some embodiments, the matching component 114 can also determine whether a new video includes video content of a reference video based on similarity in an order of appearance of the objects appearing in the new video and the reference objects appearing in the reference video. For example, the matching component 114 can determine a new video includes content of the reference video based on a determination that the order of appearance of the objects in the respective videos is the same or substantially the same (e.g., with respect to a threshold value or percentage). For example, in an embodiment in which video 200 of FIG. 2 is a reference video, the matching component 114 can determine that a new video that also includes objects, A, B, C, D, E and F (in that order) is a match with the reference video. According to this implementation, a new video can be a modified version of the reference video and can have removed some of the objects included in some frames of the reference video and/or can have added (e.g., as an overlay) new objects to some frames of the reference video. However, despite this modification, the remaining common objects of the new video and the reference video will still likely be in the same order. Thus, although the degree of similarity between objects appearing in the new video and objects appearing in a reference video can be reduced based on editing applied to the reference video to create the new video, the matching component 114 can still determine that the new video includes content of the reference video based on a combination of the amount of common objects between the respective videos and/or the degree of similarity in order of appearance of the common objects.

In some embodiments, the matching component 114 can further determine whether a new video includes video content of a reference video based on timing of appearance of objects in the new video and corresponding objects appearing in the reference video. This timing of appearance information can include the start times of the respective objects, the end times of the respective objects, the duration of appearance of the respective objects and/or the timing between appearances of different objects (also referred to as "difference in start times of object pairs").

For example, the matching component 114 can identify a string of objects included in the new video that are also included in a reference video in the same order. The matching component 114 can further align the start times of one of the objects in the string for the new video with the start time of the corresponding reference object of the string for the reference video (e.g., the first object in the respective strings). For instance, in an example embodiment in which video 200 of FIG. 2 is a reference video, if the new video and the reference video both include objects A, B, C, D, E and F in that order, the matching component 114 can align (in time) the start times of object A in both videos and then determine whether the start times of objects B, C, D, E and F are also aligned in time. If the new video includes content of the reference video, the start times of objects A, B, C, D, E and F in both videos should align if there is a match (e.g., if the new video has not been sped up or slowed down).

In some embodiments, the matching component 114 can also determine whether the durations of appearance of the respective objects in both videos align. For example, in an embodiment in which video 200 of FIG. 2 is a reference video, the matching component 114 can determine that a new video that also includes objects, A, B, C, D, E and F match with the reference video if, in addition to including objects A, B, C, D, E and F in that order, and both videos having aligned start times for objects A, B, C, D, E and F, the duration of appearance of objects A, B, C, D, E and F in both videos is approximately the same (e.g., if the new video has not been sped up or slowed down). For instance, if object A appears in the reference video for three consecutive frames, object A should appear in the new video for three consecutive frames if there is a match. According to this example, the matching component 114 can determine that a new video includes content of a reference video based on a degree of similarity in the start times of respective objects included in both videos and/or the degree of similarity in the duration of appearance of the respective objects being above or substantially equal to a threshold value.

In another example, the matching component 114 can identify a string of objects included in the new video that are also included in a reference video in the same order. The matching component 114 can determine whether differences between the start times of pairs of objects in the string of the new video correspond with differences between the start times of the corresponding pairs of objects in the string of objects in the reference video.

Figure 3:
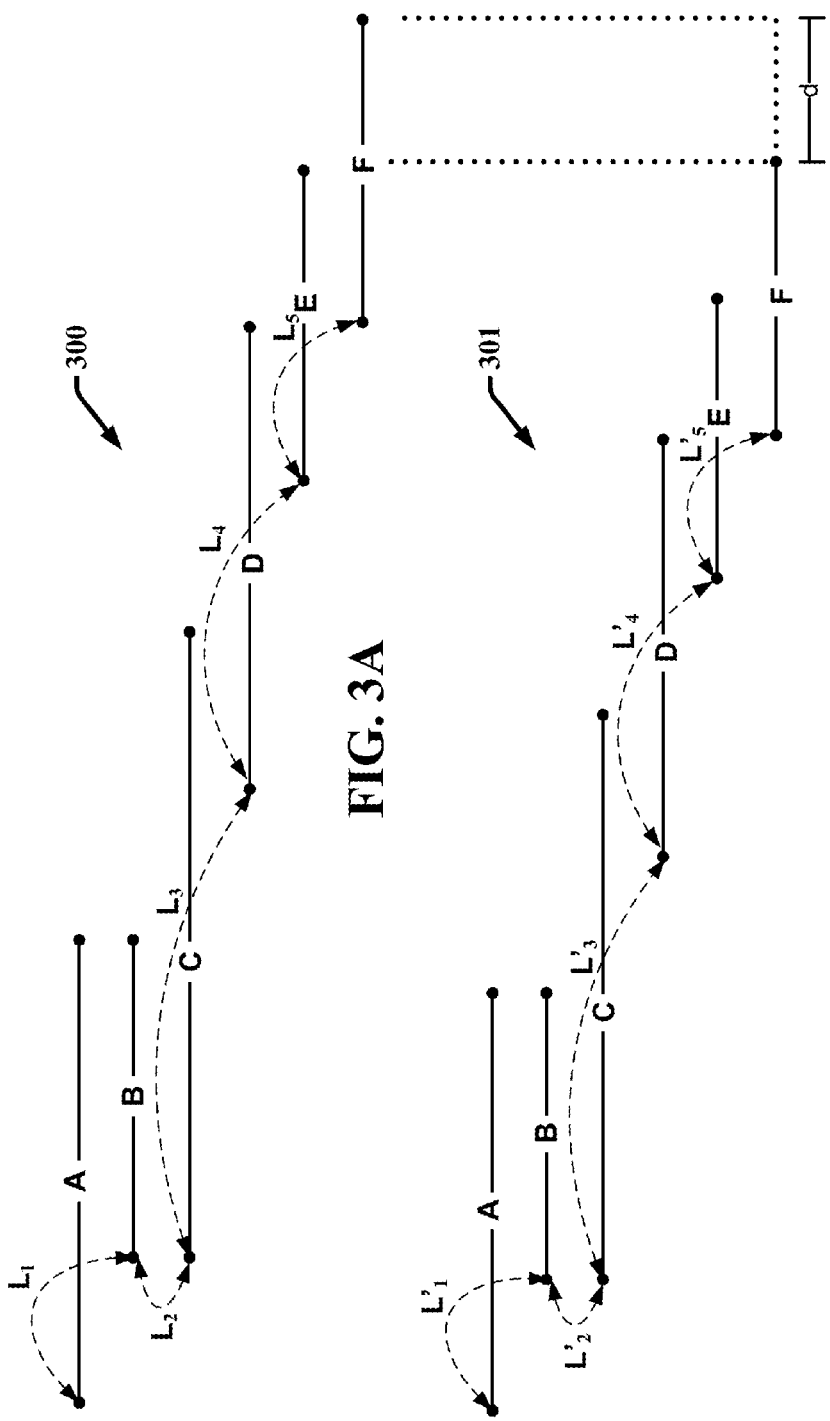
FIGS. 3A and 3B provide graphical depictions of example digest information for a reference video and a video including content of the reference video in accordance with one or more embodiments described herein.

FIGS. 3A and 3B provide graphical depictions of example digest information for a reference video and a video including content of the reference video in accordance with one or more embodiments described herein. Repetitive description of like elements employed in other embodiments described herein is omitted for sake of brevity.

For example, FIG. 3A provides a graphical depiction of example digest information 300 for video 200 in accordance with one or more embodiments described herein. The digest information 300 for video 200 can include information indicative of an order, timing and/or duration of appearance of identified objects A, B, C, D, E and F relative to the beginning and the end of the video, as represented by lines -A-, -B-, -C-, -D-, -E-, and -F- in relation to one another. The digest information 300 for video 200 can also include the duration or length of time between the start times of different consecutive objects (e.g., identified via the dashed lines). For example, the length between the start times of objects A and B is $L_1$, the length between the start times of objects B and C is $L_2$, the length between the start times of objects C and D is $L_3$, the length between the start times of objects D and E is $L_4$, and the length between the start times of objects E and F is $L_5$.

With reference to FIGS. 1 and 3A, in furtherance to the above example wherein both the new video and the reference video include objects A, B, C, D, E and F in that order, the matching component 114 can compare the length of time between the start times of objects A and B, B and C, C and D, D and E, and E and F for both the new video and the reference video (e.g., $L_1$-$L_5$). If the length between the start times of the respective pairs of objects is the same (e.g., if the new video has not been sped up or slowed down), the matching component 114 can determine that that new video likely includes content of the reference video. According to this example, the matching component 114 can determine that the new video includes content of the reference video based on a degree of similarity in the differences between the start times of the corresponding object pairs included in the new video and the reference video being above a threshold value.

The matching component 114 can also employ timing of appearance information regarding correspondence between start times of respective objects appearing in a new video and a reference video, correspondence between durations of appearances of the respective objects, and/or correspondence between difference in start times of corresponding pairs of the objects, to determine when a new video includes content of a reference video yet simply has a modified duration relative to the reference video based on speeding up or slowing down of the reference video content. For instance, a length of two minutes in between the start times of objects A and B appearing in the reference video can be considered a match against a length of 1 minute and 45 seconds between the start times of objects A and B appearing in the new video if the new content video was sped up by 12.5%.

Likewise, if the length of time of appearance of object C in the reference video is 30 seconds, the length of time of appearance of object C in the new video would be 33 seconds if the speed of the new video was reduced such that the duration of the new video is 10% longer than the reference video. Accordingly, in some embodiments, the matching component 114 can determine a relative ratio or percentage representative of the difference in duration between the start times of a pair of objects appearing in both the new video and the reference video, or a relative ratio or percentage representative of the difference in duration of appearance of an object appearing in both the new video and the reference video. The matching component 114 can further determine that the new video and the reference video match or substantially match based on a determination that the start times of additional corresponding object pairs in the new video and the reference video or the durations of appearance of additional objects in the new video and the reference video, consistently differ by the relative ratio or percentage. Thus, the matching component 114 can determine that content of a new video matches that of a reference video if the relative lengths between the start times of object pairs appearing in both videos or the relative durations of appearance of corresponding objects in both videos are the same in view of the new video being sped up or slowed down.

FIG. 3B provides a graphical depiction of example digest information 301 for a new video in accordance with one or more embodiments described herein. As exemplified via comparison of digest information 300 and digest information 301, the new video can include the same or similar content as video 200, yet the new video has a shortened duration (d) relative to video 200 due to an increased speed of the new video relative to the speed of video 200. For example, similar to video 200, the digest information 301 for the new video includes information indicative of an order, timing and duration of appearance of identified objects A, B, C, D, E and F relative to the beginning and the end of the video, as represented by lines -A-, -B-, -C-, -D-, -E-, and -F- in relation to one another. The digest information 301 for the new video substantially corresponds to the digest information 300 for video 200; however due to an increased speed of the new video relative to video 200, the length of time between the start times of different consecutive objects A and B, B and C, C and D, D and E and F, $L_1'$-$L_5'$, is shorter relative to $L_1$-$L_5$, respectively. However, assuming for example, the ratio of $L_1'/L_1$ is 90%, in some embodiments, the matching component 114 can determine that the new video includes content of video 200 if the ratios of $L_2'/L_2$, $L_3'/L_3$, $L_4'/L_4$ and $L_5'/L_5$ are also 90%, respectively (or within a defined range of 90%). It should be appreciated that the length of time between any two endpoints of lines -A-, -B-, -C-, -D-, -E-, and -F- can also be employed to facilitate determining correspondence between relative timing of appearance of objects in video 200 and the new video. For example, the lengths between start times of objects A relative to the end times of object D in both videos can be compared to determine whether they differ by a same percentage as the lengths between the end times of object C relative to the end time of objects F, and so on.

FIG. 4 illustrates a chart 400 including example digest information for video 200 in accordance with one or more embodiments described herein. Repetitive description of like elements employed in other embodiments described herein is omitted for sake of brevity.

In the embodiment shown, the digest information identifies the objects that appear in the video and the order of appearance of the objects over time $T_0$-$T_9$. It should be appreciated that the digest information can span a longer duration of the video (e.g., $T_0$-$T_n$, wherein n is the last frame of the video), and that digest information for only a portion of the video is presented merely for exemplary purposes. The digest information also includes the start times of appearance of the respective objects, the end times of appearance of the respective objects, the length of appearance of the respective objects (e.g., in number of frames or seconds), and the lengths (e.g., $L_1$-$L_5$) between the respective start times of different consecutive objects (e.g., in number of frames or seconds).

Figure 5:
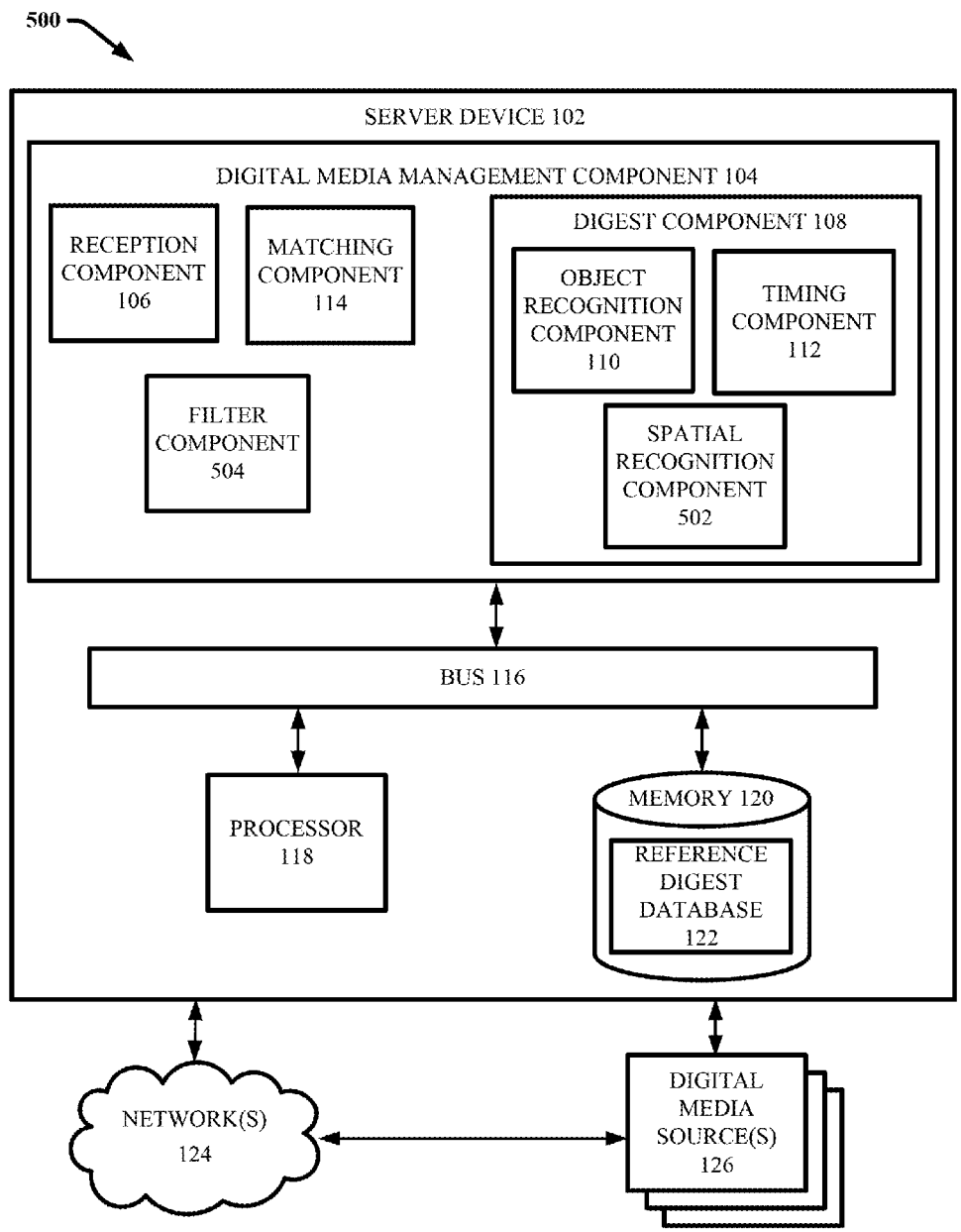
FIG. 5 illustrates another block diagram of an example, non-limiting system that facilitates detecting usage of copyrighted video content using object recognition in accordance with one or more embodiments described herein.

FIG. 5 illustrates another block diagram of an example, non-limiting system 500 that facilitates detecting usage of copyrighted video content using object recognition in accordance with one or more embodiments described herein. System 500 includes same or similar features and functionalities as system 100 with the addition of spatial recognition component 502 and filter component 504 to digital media management component 104. Repetitive description of like elements employed in other embodiments described herein is omitted for sake of brevity.

In various embodiments, the digest component 108 can include spatial recognition component 502 to determine spatial relationships between different objects appearing in a same frame or segment of a video (e.g., wherein a segment can include a plurality of consecutive frames). In some implementations, the spatial recognition component 502 can identify relative sizes of objects appearing in the same frame or segment of a video. For example, a segment of a surfing video can include a surfer in the forefront of the frame riding a wave on a red surfboard with a yellow boat in the distance. According to this example, the spatial recognition component 502 can determine the size of the red surfboard relative to the size of the yellow boat. In another implementation, the spatial recognition component 502 can determine relative positions of two or more objects appearing in the same frame or segment of a video relative to a two-dimensional or three-dimensional coordinate space. For example, with respect to a rectangular frame and a two dimensional coordinate space wherein the bottom region of the frame corresponds to an x-axis and the left side of the frame corresponds to a y-axis, the spatial recognition component 502 can determine coordinates corresponding to the positions of the objects appearing in the frame relative to the coordinate spaces. In some embodiments, the spatial recognition component 502 can further determine distances between two or more objects appearing in the same frame or video segment of a video.

Figure 6:
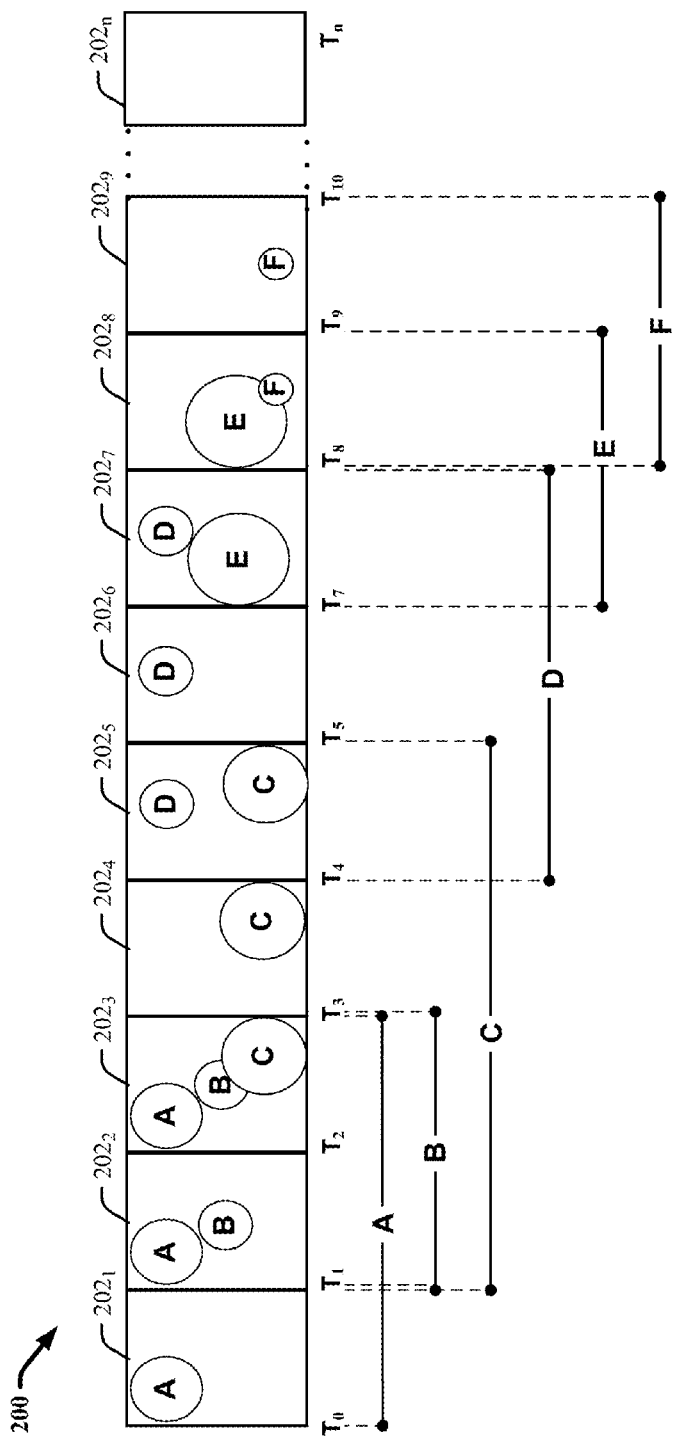
FIG. 6 illustrates another example video in which spatial relations of objects present in respective frames of the video have been identified in accordance with one or more embodiments described herein.

For example, FIG. 6 illustrates another example of video 200 with objects present and in which spatial relationships of objects present in respective frames of the video have been identified (e.g., via spatial recognition component 502) in accordance with one or more embodiments described herein. Repetitive description of like elements employed in other embodiments described herein is omitted for sake of brevity.

In particular, in addition to identifying objects A, B, C, D, E and F respectively appearing in frames $202_1$-$202_9$, the objects are respectively depicted in circles having a determined size (e.g., diameter) and location in the frame. For example, frame $202_3$ includes three circles for objects A, B and C respectively having different sizes and locations in the frame.

FIG. 7 illustrates another chart 700 including example digest information for video 200 in accordance with one or more embodiments described herein. Repetitive description of like elements employed in other embodiments described herein is omitted for sake of brevity.

In the embodiment shown, the digest information identifies the objects that appear in respective frames $202_1$-$202_9$ of the video. The digest information also includes coordinates of the respective objects in the frames relative to a two-dimensional coordinate space, wherein the respective frames have a rectangular shape and the x-axis corresponds to the bottom region of the respective frames and the y-axis corresponds to the left side of the respective frames. For those frames including two or more objects (e.g., frames $202_1$, $202_3$, $202_5$, $202_7$, and $202_8$), the relative size ratio of the objects to one another can be also identified.

In some embodiments, information regarding spatial relationships between two or more objects appearing in a same frame or segment of a video can be added to the digest information for the video to facilitate identifying usage of reference video content in another video. For example, matching component 114 can determine whether a new video includes content of a reference video based on both videos including two or more of the same objects appearing in a same frame or segment and having a same or relatively the same spatial relationship. Because the spatial relationships between two objects appearing in a same frame or segment of a video do not change if the dimensions of the video frame or segment are modified, digest information regarding spatial relationships between two or more objects appearing in a same frame or segment of a video can facilitate identifying new videos that include reference video content in a manner that modifies the frame size of the reference video content. For example, a new video can include the surfing video in the example above playing on a television in the background while a group of surf instructors provide commentary on the surfing video. According to this example, although the content of the surfing video does not make up the entirety of the frame dimensions, the relative sizes and positions of the red surfboard relative to the yellow boat will be the same (or approximately the same), thus facilitating detection of the usage of the surfing video content in the new video.

Referring back to FIG. 5, in various embodiments, the matching component 114 can employ one or more analysis techniques that account for the degree of similarity between digest information for a new video and a reference video with respect to a combination of the various types of digest information described herein, including, but not limited to, objects appearing in the video, detailed characteristics associated with the objects (e.g., object coloration, object type, etc.), order of appearance of the objects, timing of appearance of the objects (which includes relative timing to account for new videos that have been sped up or slowed down) and/or spatial relationships between two or more objects appearing in a same frame or segment of the video.

In some implementations, the matching component 114 can determine a match score that accounts for a total degree of similarity between a new video and a reference video with respect to a combination of one or more of the factors previously noted. For example, a new video can have a 75% degree of similarity with respect to shared objects, a 90% degree of similarity with respect to order of appearance of the shared objects, a 95% degree of similarity with respect to timing of appearance of the shared objects, and 100% degree of similarity with respect to spatial relationship between two or more of the shared objects appearing in the same frame or segment of the video, resulting in a match score of 90% degree of similarity.

In some embodiments, the matching component 114 can also apply different weights to the respective factors that are determined to have a higher impact on matching accuracy (e.g., timing of appearance of objects versus number of corresponding objects). The matching component 114 can further employ a threshold requirement wherein new videos having a match score greater than a defined value can be considered a match with the reference video.

In some embodiments, the matching component 114 can employ filter component 504 to facilitate enhancing the efficiency with which the matching component 114 determines whether a new video includes reference video content (e.g., using processor 118 or another processor). For example, rather than scanning a new video against every entry in the reference digest database 122 with respect to each type of digest information category, the matching component 114 can employ the filter component 504 to reduce the number of potential candidate reference videos to evaluate more thoroughly. For example, the filter component 504 can apply one or more first filtering criteria that reduce the set of reference video in the reference digest database 122 to a smaller subset of potential matches. The matching component 114 can further evaluate the subset of the reference videos with respect to one or more second criteria. In an example, the filter component 504 can apply a hierarchy filtering scheme, wherein the filter component 504 first identifies a first subset of the reference videos having at least a first defined percent of shared objects with a new video. The filter component 504 can then reduce the first subset of the reference videos to second subset of reference videos based on a degree of correspondence between an order of appearance of the shared objects being another threshold value. In some embodiments, the matching component 114 can further evaluate the second subset of reference videos based on correspondence between timing of appearance of the respective objects and/or degree of similarity between spatial relationships of two or more of the shared objects appearing in a same frame or segment of the new video and the reference videos.

In another example embodiment, the matching component 114 can evaluate a video for potential usage of reference video content by employing the filter component 504 to apply a first filter that identifies a subset of the reference videos in the reference digest database 122 having at least a defined number of corresponding objects to an evaluated video and appearing in a same order as the evaluated video. According to this example, the subset of the reference videos can include reference videos that have different amounts of corresponding objects depending on the amount of reference video content included in the evaluated video. For example, the evaluated video can include a short segment of a long reference video and thus include only a small subset of objects appearing in the reference video. In another example, the evaluated video can include objects removed from the reference video content. In yet another example, the evaluated video can include added objects overlaid on reference video content.

In some embodiments, the matching component 114 can further isolate only the matching objects between the video and the respective reference videos in the subset and determine whether other factors including, for example, timing of appearance of the matching objects, specific details of the matching objects or spatial relationships of two or more matching objects appearing in a same video frame or segment, respectively correspond (e.g., either exactly or relatively in consideration of a modified timing of the video, a coloration effect applied to the video, or a modified frame size of the video).

Figure 8:
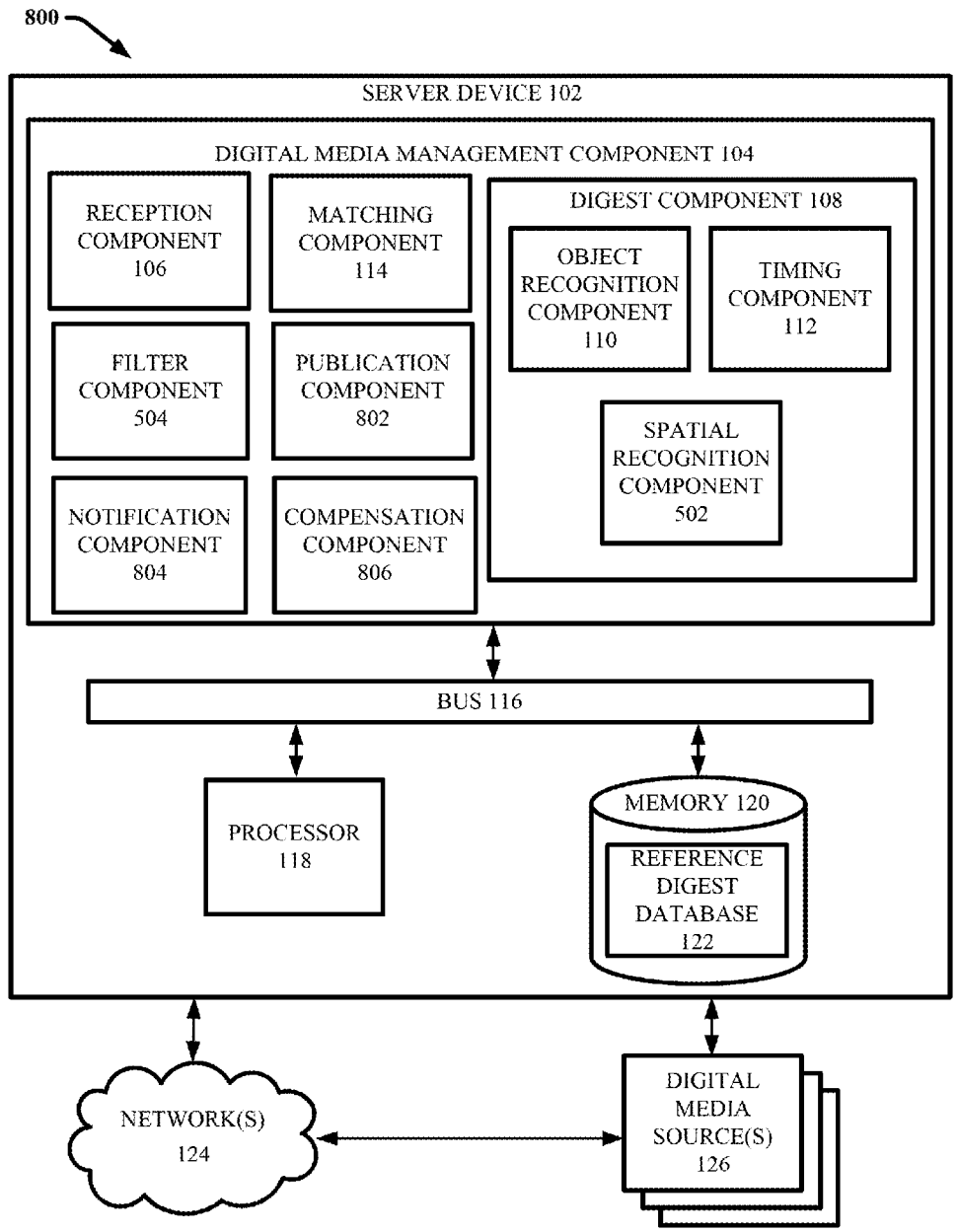
FIG. 8 illustrates a block diagram of another example, non-limiting system that facilitates detecting usage of copyrighted video content using object recognition in accordance with one or more embodiments described herein.

FIG. 8 illustrates a block diagram of another example, non-limiting system 800 that facilitates detecting usage of copyrighted video content using object recognition in accordance with one or more embodiments described herein. System 800 includes the same or similar aspects as system 500 with the addition of publication component 802, notification component 804 and compensation component 806 to digital media management component 104. Repetitive description of like elements employed in other embodiments described herein is omitted for sake of brevity.

In various embodiments, in response to a determination that a new video does not include media content included in reference video, the digest component 108 can add information identifying the new video and digest information for the new video to the reference digest database 122. The new video can thus become a new reference video in some embodiments. In some implementations, the notification component 804 can generate and/or transmit a notification (e.g., using an electronic message or other notification approach) to an entity affiliated with the new video (e.g., an entity affiliated with the new video can be a human or electronic uploader of the new video). The notification can inform the entity that the new video does not include reference video content (e.g., copyrighted).

In an embodiment in which the server device 102 is or is affiliated with a media content provider (e.g., a video sharing and streaming service, a social networking system that provides for sharing or video content), the digital media management component 104 can process a new video with respect to detecting usage of reference media content in association with a request to publish the new video via the media content provider. According to this embodiment, in response to a determination that the new video does not include reference video content, the publication component 802 can proceed to publish the new video on a network accessible platform (e.g., a website, an application, etc.) employed by the media provider to distribute the media content.

The digital media management component 104 can further facilitate mitigating the unauthorized use of reference (e.g., copyrighted) video content. For example, in an embodiment in which a video including reference video content is associated with a request to publish the video, the publication component 802 can automatically reject publication of the video on the network accessible platform employed by the media provider and/or, in some embodiments, the notification component 804 can generate a notification that informs an entity associated with use of the video (e.g., an uploader of the new video) that the video is or includes reference video content. In some implementations, the notification can identify the reference video content and indicate a match score determined by the matching component 114 regarding the degree of similarity between the video content and the reference video content.

In another embodiment, in response to a determination by matching component 114 that a video is or includes reference video content, the notification component 804 can generate and/or transmit a notification to an entity associated with ownership of the reference video content (e.g., the copyright holder, a licensee of the copyright holder). The notification can inform the entity regarding usage of the reference video content, identify the video that is or includes the reference video content, and/or identify the entity associated with creation or usage of the video. In some implementations, the notification can include contact information for the entity associated with usage and/or creation of the video.

In various additional embodiments, compensation component 806 can facilitate providing entities associated with ownership of reference video content (e.g., the copyright holders, licensees of the copyright holders) compensation for usage of their reference video content by others. For example, in one implementation, in response to a determination (e.g., by matching component 114) that a particular video is or includes reference video content, the compensation component 806 can facilitate provision of a royalty payment to the entity that owns the reference video content. For instance, the compensation component 806 can charge the user associated with upload of the particular video a defined royal payment that accounts for the manner in which the user employed or is intended to employ the reference video content.

While FIGS. 1, 5 and 7 depict separate components in the digital media management component 104, it is to be appreciated that two or more components can be implemented in a common component. Further, it is to be appreciated that the design of the digital media management component 104 can include other component selections, component placements, etc., to facilitate identifying usage of reference (e.g., copyrighted) video content and mitigating the unauthorized usage of the reference video content. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to the digital media copyright detection subject area. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to automated digital copyright detection systems by improving processing efficiency among processing components in digital copyright detection systems, reducing delay in processing performed by the processing components, and improving the accuracy in which the processing systems identify usage of copyrighted video content.

Figure 9:
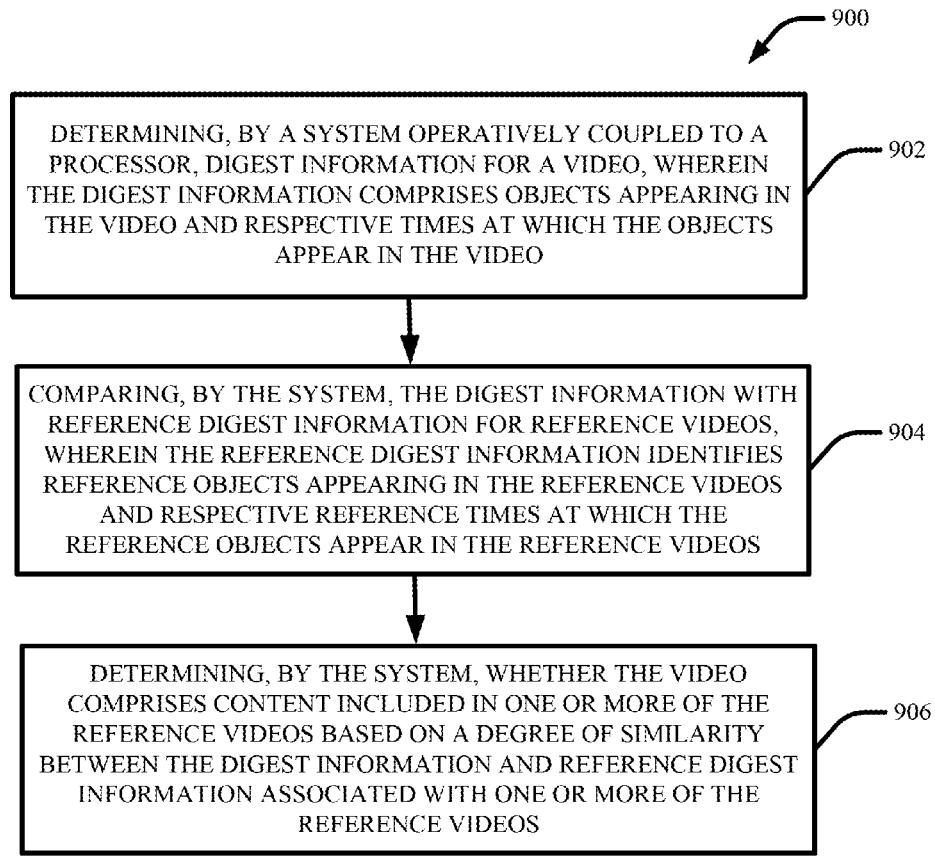
FIG. 9 illustrates a flow diagram of an example, non-limiting computer-implemented method that facilitates detecting usage of copyrighted video content using object recognition in accordance with one or more embodiments described herein.

FIG. 9 illustrates a flow diagram of an example, non-limiting computer-implemented method 900 that facilitates detecting usage of copyrighted video content using object recognition in accordance with one or more embodiments described herein. At 902, a system operatively coupled to a processor determines digest information for a video, wherein the digest information comprises objects appearing in the video and respective times at which the objects appear in the video (e.g., via digest component 108). At 904, the system compares the digest information with reference digest information for reference videos, wherein the reference digest information identifies reference objects appearing in the reference videos and respective reference times at which the reference objects appear in the reference videos (e.g., via matching component 114). At 906, the system determines whether the video comprises content included in one or more of the reference videos based on a degree of similarity between the digest information and reference digest information associated with one or more of the reference videos (e.g., via matching component 114). For example, the system can determine that the video includes reference video content based on digest information for the video and the reference video indicating that the respective videos include a substantial amount (e.g., with respect to a threshold value) of common objects, the common objects appear in both videos in a substantially same order (e.g., with respect to a threshold percentage) and/or the timing of appearance of the common object in both videos is substantially the same (e.g., with respect to a threshold value or range of time values).

Figure 10:
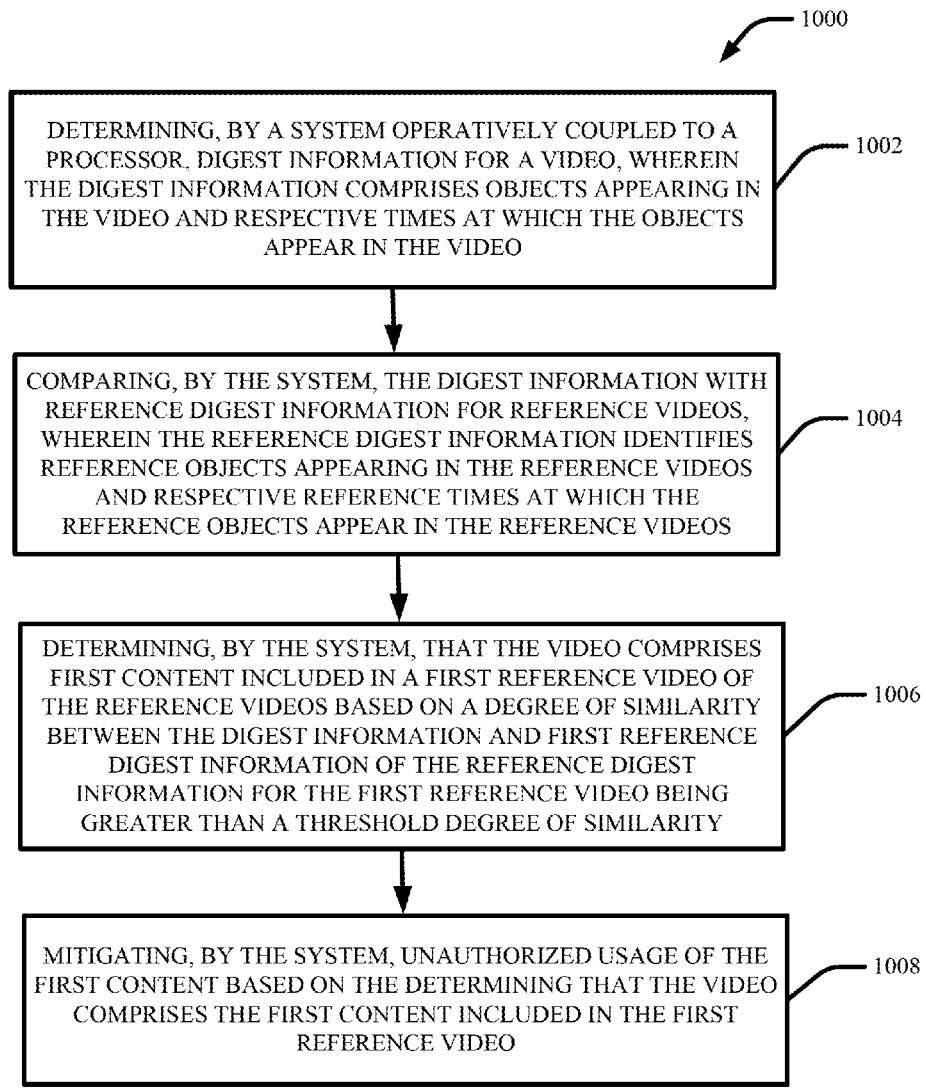
FIG. 10 illustrates a flow diagram of another example, non-limiting computer-implemented method that facilitates detecting usage of copyrighted video content using object recognition in accordance with one or more embodiments described herein.

FIG. 10 illustrates a flow diagram of another example, non-limiting computer-implemented method 1000 that facilitates detecting usage of copyrighted video content using object recognition in accordance with one or more embodiments described herein. At 1002, a system operatively coupled to a processor determines digest information for a video, wherein the digest information comprises objects appearing in the video and respective times at which the objects appear in the video (e.g., via digest component 108). At 1004, the system compares the digest information with reference digest information for reference videos, wherein the reference digest information identifies reference objects appearing in the reference videos and respective reference times at which the reference objects appear in the reference videos (e.g., via matching component 114). At 1006, the system determines that the video comprises first content included in a first reference video of the reference videos based on a degree of similarity between the digest information and first reference digest information of the reference digest information for the first reference video being greater than a threshold degree of similarity (e.g., via matching component 114). At 1008, the system mitigates unauthorized usage of the first based on the determining that the video comprises the first content included in the first reference video (e.g., via publication component 802, notification component 804 or compensation component 806). For example, the system can reject a request to publish the video on a network. In another example, the system can notify an entity associated with ownership of the first reference video regarding the video, the usage of the reference video content in the video, the degree of similarity between the video content and the reference video content, and/or contact information for the user and/or creator of the video. In another example, the system can facilitate providing the entity associated with ownership of the reference video a royalty payment by the user of the video.

Figure 11:
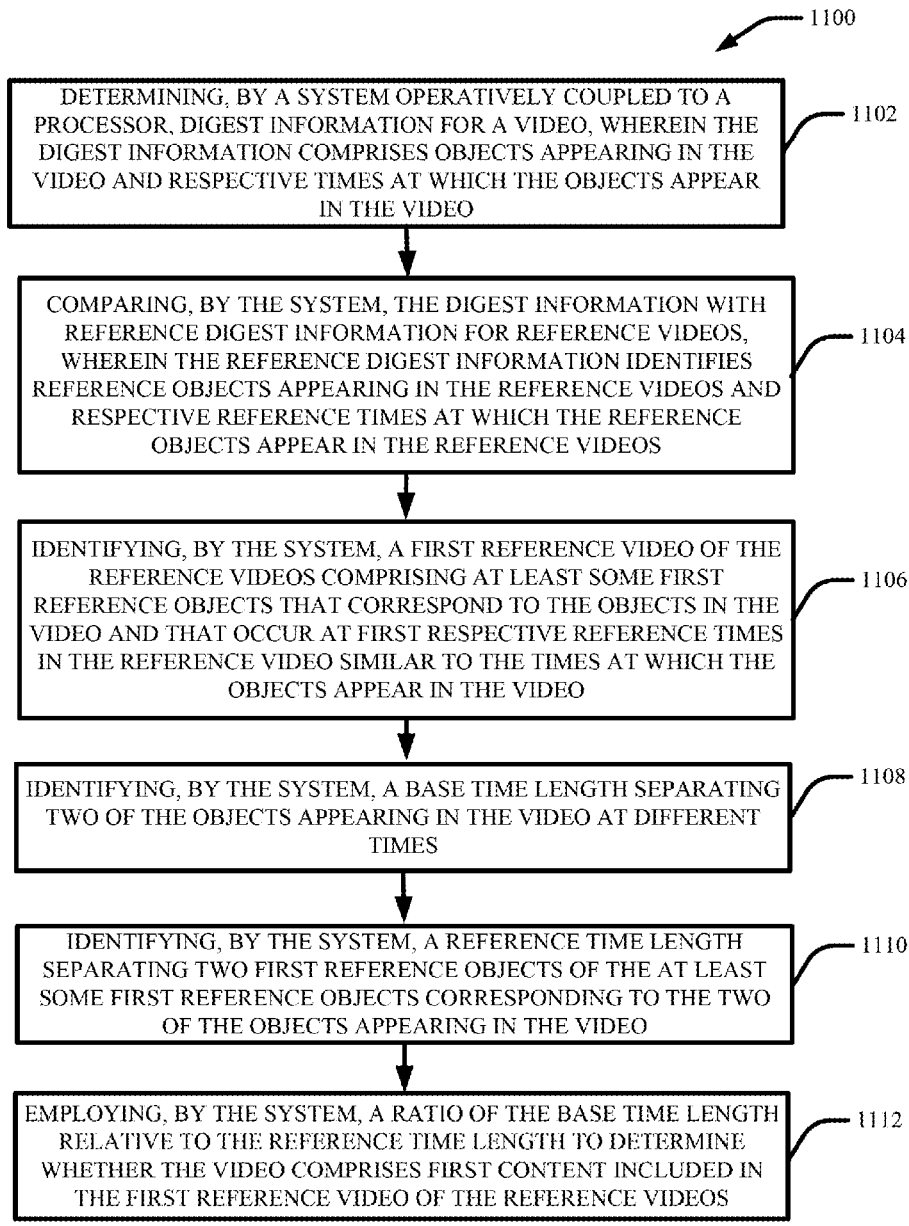
FIG. 11 illustrates a flow diagram of another example, non-limiting computer-implemented method that facilitates detecting usage of copyrighted video content using object recognition in accordance with one or more embodiments described herein.

FIG. 11 illustrates a flow diagram of another example, non-limiting computer-implemented method 1100 that facilitates detecting usage of copyrighted video content using object recognition in accordance with one or more embodiments described herein. At 1102, a system operatively coupled to a processor determines digest information for a video, wherein the digest information comprises objects appearing in the video and respective times at which the objects appear in the video (e.g., via digest component 108). At 1104, the system compares the digest information with reference digest information for reference videos, wherein the reference digest information identifies reference objects appearing in the reference videos and respective reference times at which the reference objects appear in the reference videos (e.g., via matching component 114). At 1106, based on the comparing, the system identifies a first reference video of the reference videos comprising at least some first reference objects that correspond to the objects in the video and that occur at first respective reference times in the reference video similar to the times at which the objects appear in the video (e.g., via matching component 114). At 1108, the system identifies a base time length separating two of the objects appearing in the video at different times. For example, with reference to FIGS. 3A and 3B, assuming digest information 301 represents digest information for the video of method 1100 and digest information 300 represents digest information for the first reference video of method 1100, the system can identify any length between two end points of lines -A-, -B-, -C-, -D-, -E-, and -F- as the base length, such as $L_1'$. At 1110, the system identifies a reference time length separating two first reference objects of the at least some first reference objects corresponding to the two of the objects appearing in the video. For example, with reference to FIGS. 3A and 3B, if the system selects $L_1'$ as the base time length, the system will select $L_1$ as the reference time length. At 1112, the system can further employ a ratio of the base time length relative to the reference time length to determine whether the video comprises first content included in the first reference video of the reference videos. For example, the system can employ the ratio of $L_1'/L_1$ to determine whether additional lengths between other objects appearing in the video (e.g., $L_2'$, $L_3'$, $L_4'$, and $L_5'$) and corresponding lengths between other reference objects in the reference video (e.g., $L_2$, $L_3$, $L_4$, and $L_5$) respectively and consistently differ by the ratio. Accordingly, the system can identify (e.g., via matching component 114), new videos that include sped up or slowed down versions of reference video content.

Figure 12:
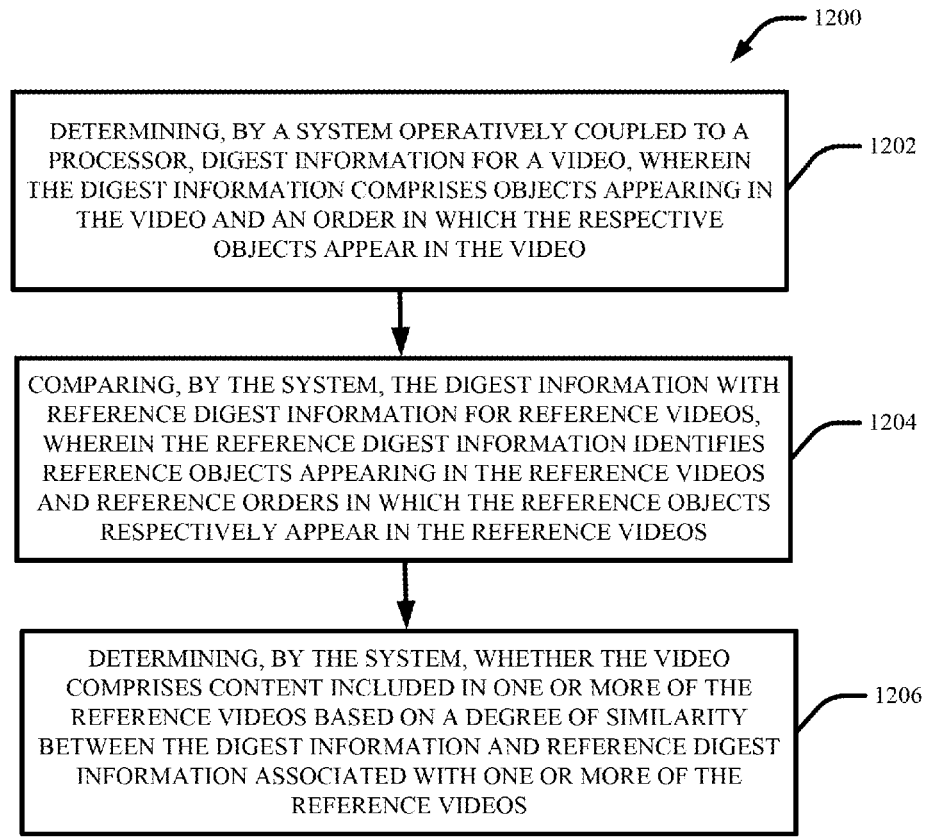
FIG. 12 illustrates a flow diagram of another example, non-limiting computer-implemented method that facilitates detecting usage of copyrighted video content using object recognition in accordance with one or more embodiments described herein.

FIG. 12 illustrates a flow diagram of an example, non-limiting computer-implemented method 1200 that facilitates detecting usage of copyrighted video content using object recognition in accordance with one or more embodiments described herein. At 1202, a system operatively coupled to a processor, determines digest information for a video, wherein the digest information comprises objects appearing in the video and an order in which the respective objects appear in the video (e.g., via digest component 108). At 1204, the system compares the digest information with reference digest information for reference videos, wherein the reference digest information identifies reference objects appearing in the reference videos and reference orders in which the respective reference objects respectively appear in the reference videos (e.g., via matching component 114). At 1206, the system determines whether the video comprises content included in one or more of the reference videos based on a degree of similarity between the digest information and reference digest information associated with one or more of the reference videos (e.g., via matching component 114).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 13:
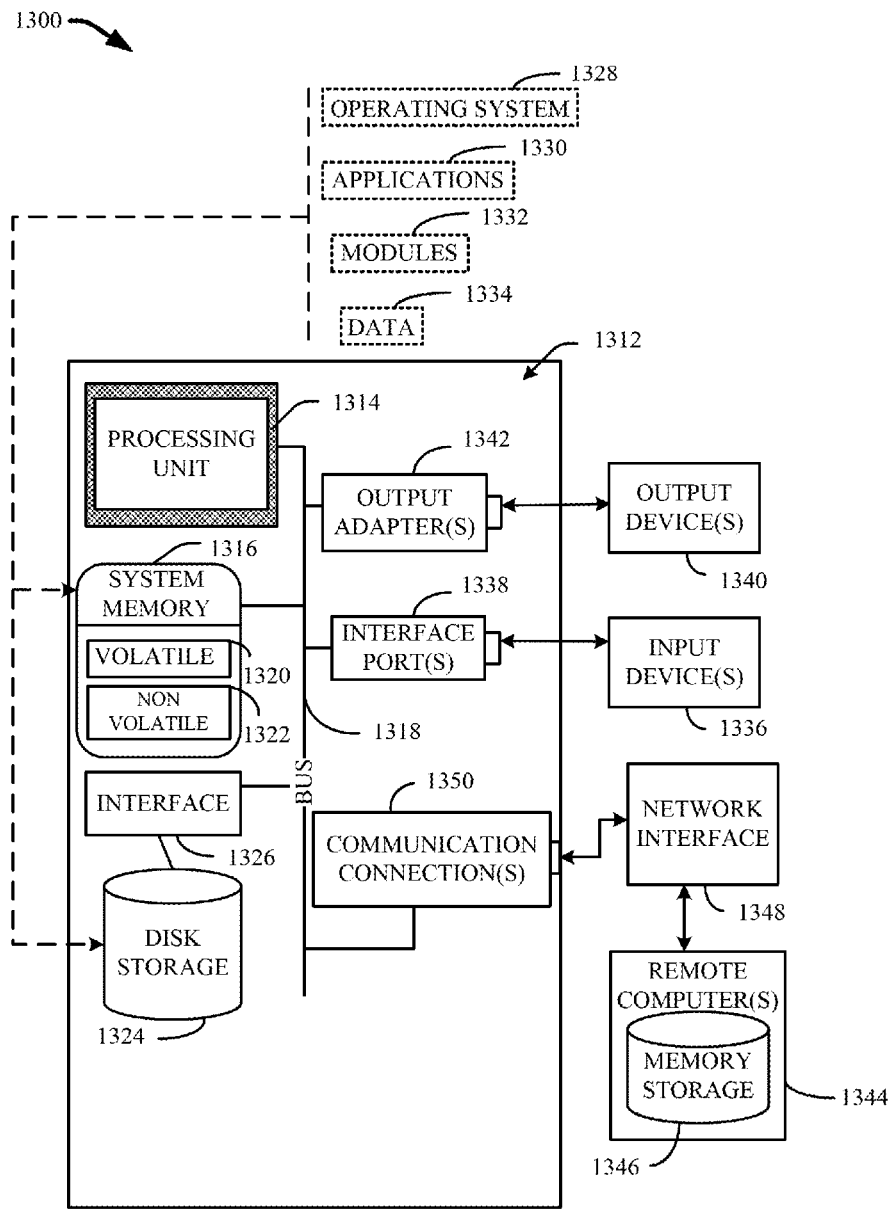
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1301 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1301. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a system operatively coupled to a processor, digest information for a video, wherein the digest information comprises objects appearing in the video and respective times at which the objects appear in the video;
   comparing, by the system, the digest information with reference digest information for reference videos, wherein the reference digest information identifies reference objects appearing in the reference videos and respective reference times at which the reference objects appear in the reference videos;
   determining, by the system, whether the video comprises content included in one or more of the reference videos based on a degree of similarity between the digest information and reference digest information associated with one or more of the reference videos, thereby facilitating improved processing time and accuracy for automatic detection of unauthorized usage of reference video content;
   identifying, by the system, a base time length separating two of the objects appearing in the video at different times; and
   employing, by the system, a ratio of the base time length relative to a reference time length separating two first reference objects corresponding to two of the objects to determine whether the video comprises first content included in the first reference video of the reference videos.

2. The computer-implemented method of claim 1, wherein the determining comprises:
   identifying, by the system based on the comparing, a first reference video of the reference videos comprising at least some first reference objects that correspond to the objects in the video and that occur at first respective reference times in the first reference video corresponding to the times at which the objects appear in the video, thereby facilitating improved processing time for automatic detection of unauthorized usage of reference video content.

3. The computer-implemented method of claim 1, wherein the determining the digest information for the video further comprises determining time lengths between the respective times at which the objects appear in the video, and wherein the reference digest information further comprises reference time lengths between the respective reference times at which the reference objects appear in the reference videos.

4. The computer-implemented method of claim 1, further comprising:
   determining, by the system, that the video comprises first content included in a first reference video of the reference videos based on a first degree of similarity between the digest information and first reference digest information of the reference digest information for the first reference video being greater than a threshold degree of similarity, and wherein the determining that the video comprises the first content included in the first reference video facilitates mitigating, by the system, unauthorized usage of the first content.

5. The computer-implemented method of claim 1, further comprising:
   determining, by the system, that the video comprises first content included in a first reference video of the reference videos based on a first degree of similarity between the digest information and first reference digest information of the reference digest information for the first reference video satisfying a condition related to a threshold degree of similarity; and
   rejecting, by the system, publication of the video on a network based on the determining that the video comprises the first content included in the first reference video.

6. The computer-implemented method of claim 1, further comprising:
   determining, by the system, that the video comprises first content included in a first reference video of the reference videos based on a first degree of similarity between the digest information and first reference digest information of the reference digest information for the first reference video satisfying a criterion related to a threshold degree of similarity; and generating, by the system, a notification identifying the first content included in the video, the first reference video and the degree of similarity; and transmitting, by the system, the notification to an entity associated with ownership of the first reference video.

7. The computer-implemented method of claim 6, further comprising:

facilitating, by the system, provision of a royalty payment to the entity based on the determining that the video comprises the first content included in the first reference video.

8. The computer-implemented method of claim 1, wherein the determining comprises:

identifying, by the system, a first reference video of the reference videos comprising at least some first reference objects that correspond to the objects in the video and that occur at first respective reference times in the first reference video similar to the times at which the objects appear in the video.

9. The computer-implemented method of claim 1, wherein the determining comprises: determining that the video comprises first content included in a first reference video of the reference videos based on first reference digest information for the first reference video indicating first reference objects in the first reference video substantially correspond to the objects in the video relative to a threshold degree of correspondence, and the first reference objects and the objects respectively appear in the first reference video and the video in a same order.

10. A computer-implemented method, comprising:

determining, by a system operatively coupled to a processor, digest information for a video, wherein the digest information comprises objects appearing in the video, an order in which the objects appear in the video, and respective times at which the objects appear in the video;

comparing, by the system, the digest information with reference digest information for reference videos, wherein the reference digest information identifies reference objects appearing in the reference videos and reference orders in which the reference objects respectively appear in the reference videos;

determining, by the system, whether the video comprises content included in one or more of the reference videos based on a degree of similarity between the digest information and reference digest information associated with one or more of the reference videos, thereby facilitating improved processing time and accuracy for automatic detection of unauthorized usage of reference video content;

identifying, by the system, a base time length separating two of the objects appearing in the video at different times; and employing, by the system, a ratio of the base time length relative to a reference time length separating two first reference objects corresponding to two of the objects to determine whether the video comprises first content included in the first reference video of the reference videos.

11. The computer-implemented method of claim 10, wherein the determining comprises:

identifying, by the system based on the comparing, a first reference video of the reference videos comprising at least some reference objects that correspond to the objects in the video and that occur in a first reference order corresponding to the order in which the objects appear in the video, thereby facilitating improved processing efficiency for the processor.

12. The computer-implemented method of claim 10, wherein the determining the digest information for the video further comprises determining time lengths between the respective times at which the objects appear in the video, and wherein the reference digest information further comprises reference time lengths between respective reference times at which the reference objects appear in the reference videos.

13. The computer-implemented method of claim 10, further comprising:

determining, by the system, that the video comprises first content included in a first reference video of the reference videos based on a first degree of similarity between the digest information and first reference digest information of the reference digest information for the first reference video being greater than a threshold degree of similarity, and wherein the determining that the video comprises the first content included in the first reference video facilitates mitigating, by the system, unauthorized usage of the first content.

14. The computer-implemented method of claim 10, wherein the determining comprises:

identifying, by the system, a first reference video of the reference videos comprising at least some first reference objects that correspond to the objects in the video and that occur in a first reference order in the first reference video corresponding to the order in which the objects appear in the video.

15. The computer-implemented method of claim 10, wherein the determining the digest information for the video further comprises determining spatial relationships between subsets of the objects appearing in same frames of the video, and wherein the reference digest information further comprises reference spatial relationships between reference subsets of the reference objects respectively appearing in same reference frames of the reference videos.

16. The computer-implemented method of claim 10, wherein the determining comprises: determining that the video comprises first content included in a first reference video of the reference videos based on first reference digest information for the first reference video indicating first reference objects in the first reference video correspond to the objects in the video, and the first reference objects and the objects respectively appear in the first reference video and the video in a same order.

17. A non-transitory computer program product for digital video copyright protection, the computer program product comprising a computer readable storage medium having program instructions embodied therewith, the program instructions executable by a processing component to cause the processing component to:

determine, by the processing component, digest information for a video, wherein the digest information comprises objects appearing in the video, respective times at which the objects appear in the video, and time lengths between the respective times at which the objects appear in the video;

compare, by the processing component, the digest information with reference digest information for reference videos, wherein the reference digest information identifies reference objects appearing in the reference videos, respective reference times at which the reference objects appear in the reference videos, and reference time lengths between the respective times at which the reference objects appear in the reference videos;

determine, by the processing component, whether the video comprises content included in one or more of the reference videos based on a degree of similarity between the digest information and reference digest information associated with one or more of the reference videos, thereby facilitating improved processing time and accuracy for automatic detection of unauthorized usage of reference video content;

identifying, by the system, a base time length separating two of the objects appearing in the video at different times; and employing, by the system, a ratio of the base time length relative to a reference time length separating two first reference objects corresponding to two of the objects to determine whether the video comprises first content included in the first reference video of the reference videos.

18. The non-transitory computer program product of claim 17, wherein the program instructions are further executable by the processing component to cause the processing component to:

identify, by the processing component, a first reference video of the reference videos comprising at least some first reference objects corresponding to the objects in the video, the at least some first reference objects occurring at first respective reference times in the first reference video corresponding to the times at which the objects appear in the video, and first reference time lengths between the first respective reference times corresponding to the time lengths between the respective times at which the objects appear in the video.

19. The non-transitory computer program product of claim 17, wherein the program instructions are further executable by the processing component to cause the processing component to:

determine, by the processing component, that the video comprises first content included in a first reference video of the reference videos based on a first degree of similarity between the digest information and first reference digest information of the reference digest information for the first reference video satisfying a defined criterion associated with a threshold degree of similarity; and mitigate, by the processing component, unauthorized usage of the content based on determining that the video comprises the first content included in the first reference video.

20. The non-transitory computer program product of claim 17, wherein the digest information for the video further comprises spatial relationships between subsets of the objects appearing in same frames of the video as determined by the processing component, and wherein the reference digest information further comprises reference spatial relationships between reference subsets of the reference objects respectively appearing in same reference frames of the reference videos.

* * * * *